United States Patent [19]

Groleau et al.

[11] 3,977,255

[45] Aug. 31, 1976

[54] EVALUATING PRESSURE PROFILE OF MATERIAL FLOWING TO MOLD CAVITY

[75] Inventors: Rodney J. Groleau, Plantsville; Donald C. Paulson, Southington, both of Conn.

[73] Assignee: Control Process, Incorporated, Plantsville, Conn.

[22] Filed: Aug. 18, 1975

[21] Appl. No.: 605,342

[52] U.S. Cl. ............................. 73/432 R; 235/151.1
[51] Int. Cl.² .......................................... B29F 1/00
[58] Field of Search ................... 73/54, 389, 432 R; 425/149; 264/40; 235/151.1

[56] References Cited
UNITED STATES PATENTS

| | | | |
|---|---|---|---|
| 3,792,134 | 2/1974 | Paulson | 264/40 |
| 3,840,312 | 10/1974 | Paulson et al. | 425/149 |
| 3,860,801 | 1/1975 | Hunkar | 235/151.1 |
| 3,893,792 | 7/1975 | Laczko | 425/149 |

*Primary Examiner*—Charles A. Ruehl

[57] ABSTRACT

A method is provided which is particularly suited for employment in conjunction with the operation of an injection molding machine for purposes of determining during the cycle of operation of the machine whether the material flow conditions to the mold cavity of the machine which are required for the production of parts having the desired characteristics are present. More specifically, a method is provided wherein a comparison is made between the slope of a portion of the actual profile curve being generated during the flow of the material to the mold cavity of the machine and the slope of a corresponding portion of the theoretical profile curve which should be generated by the material flowing to the mold cavity if parts having the desired characteristics are to be produced. For purposes of determining the slope of a portion of the actual profile curve, a pair of pressure sensings are taken and time measurements corresponding thereto are made. The values for pressure and time obtained therefrom are then plotted on a graph having cavity pressure as the ordinate and time as the abscissa. Through the use thereof, one is capable of producing a portion of an actual profile curve. The slope of the latter referenced plotted portion of the actual profile curve is determined and then compared to the slope of the corresponding portion of the theoretical profile curve. Based on the latter comparison, any corrective adjustments, if found to be required, can then be made in the molding machine controls. Moreover, such adjustments can be made so as to take effect either during the same cycle of operation of the machine or during a succeeding cycle of operation thereof.

12 Claims, 4 Drawing Figures

EVALUATING PRESSURE PROFILE OF MATERIAL FLOWING TO MOLD CAVITY

BACKGROUND OF THE INVENTION

It has long been known that variations in the pressure of the material being molded in the mold cavity of a molding machine or cast in the cavity of a die cast machine is the most frequent cause of flash being formed in the parts being produced, short shots of material being fed to the cavity, and inconsistencies in the properties of the parts produced. With particular reference to the question of molding machines, pressure variations occur because of changes in the viscosity of the material, i.e., plastic being molded. Such changes are commonly found to be due to either temperature variations or molecular weight. Pressure variations also occur as a result of variations in machine performance due to such things as timer errors, oil temperature, hydraulic response, etc. In addition, pressure variations are attributable to operator errors wherein wrong timer settings, etc. are employed by the operator.

Most rejects, it has been found, are caused by events occurring during the filling portion, i.e., when material is being fed to the cavity, and during the packing portion, i.e., when the material is solidifying in the cavity of the molding machine, of the molding cycle. It is this part of the cycle, i.e., the filling and packing portions thereof when orientation is developed, molecular packing is induced, and peak pressures are determined. Any errors or inconsistencies in the dynamics of filling and packing result in variations in the parts produced.

As the cavity fills with material, the pressure therein will rise slowly until packing of the material begins to occur, whereupon the pressure will rise rapidly. This may be referred to as the dynamic portion of the cycle of operation of the machine. If the pressure in the cavity rises too slowly or is stopped too soon, then short shots will occur because the material is then afforded an opportunity to solidify before the cavity is entirely filled, or in the case of the mold having plural cavities, before all of the cavities are full of material. If the pressure rises too rapidly or occurs too long, then flash is likely to form on the part being produced due to overpacking.

The likelihood that pressure variations will occur causing the undesirable results described above is particularly likely where thin-walled parts, i.e., lids, containers, housings, etc. are being produced inasmuch as the production of the latter requires that the cavity be filled quickly but not be overpacked. These two requirements however are often in conflict. As a result, short shots caused by insufficient pressure, flashed parts caused by excessive pressure, and warped parts caused by overpacking or underpacking are common.

In order to eliminate the existence of undesirable pressure variations in the mold cavity, a number of different types of control systems have been proposed for inclusion in molding machines as a means of effectuating control over the latter thereby to enable the amount of pressure in the cavity of the machine to be regulated. Because of the difficulty in controlling pressure however, one approach which has been employed in the prior art is for instance the so-called volume-feeding technique wherein a limit switch or other equivalent control device is utilized to control the amount of a material fed each cycle. Moreover, the screw by means of which the material is fed into the mold is caused to move through a predetermined distance. This method works as long as the limit switch is accurate and the non-return valve operatively associated with the screw does not leak. However, these two conditions rarely exist for long.

Another approach similar to the aforedescribed volume-feeding technique, which has also been utilized heretofore is the technique of weight-feeding wherein the theoretical weight of the material needed to fill the mold completely is determined and this amount of material is caused to be fed to the mold once each cycle. Although the weight-feeding technique has been found to produce more accurate results than the volume-feeding technique, it also nevertheless suffers from a disadvantage. Namely, even a small deviation in the weight of the material fed to the mold can produce wide variations in cavity pressure.

Still another technique, which previously has sometimes been employed, involves sensing the forward velocity of the screw which is operative to cause material to be fed to the mold. The difficulty with this approach however is that a change in the forward velocity of the screw may not necessarily arise from the fact that the mold cavity has become filled with the material. Rather, this change may be attributable to the existence of other factors affecting the flow of the material intermediate the point at which the material leaves engagement with the screw and the point at which the material enters the mold cavity. More particularly, since cavity pressure is not being determined from readings taken directly within the cavity, but instead is based on readings obtained at a point remote therefrom, other factors such as a blockage in the path of flow of the material, etc., may actually be the cause for a change occurring in the forward velocity of the screw rather than the fact that the cavity has become filled with material. Thus, utilizing this technique there exists opportunities for inaccurately portraying the actual condition of the cavity pressure.

Other techniques have been employed heretofore in the prior art, however these other techniques have also suffered from one or more disadvantages. There has thus existed a need to provide a method, which did not suffer from the same disadvantages which characterize prior art methods of controlling cavity pressure, but which would be operable for purposes of automatically measuring molded part consistency and determining the proper molding machine adjustments which are necessitated in order to correct for process changes. In accord with the present invention, such a method has been provided. The latter method involves the utilization of the slope of a portion of the profile curve for the material being supplied to the mold cavity of the molding machine. More specifically, a comparison is had between the slope of a portion of the actual profile curve, the latter being determined from pressure sensings and time measurements taken during a cycle of operation of the molding machine, and a corresponding portion of the theoretical profile curve which should exist if parts having the desired characteristics are to be produced. Based on the latter comparison, any corrective adjustments which appear to be required are made to the molding machine controls.

Accordingly, it is an object of the present invention to provide a novel and improved method which is operable for purposes of determining whether the material flow conditions to the mold cavity of a molding machine which must be present in order to ensure the production of molded parts having the desired characteristics do in fact exist.

It is also an object of the present invention to provide such a method wherein there is established a portion of the actual profile curve of the pressure of the material present in a mold cavity furing a cycle of operation of a molding machine from which the slope of the aforesaid portion of the actual profile curve may be determined, and thereafter compared to the corresponding portion of the theoretical profile curve which should exist to obtain the desired product results.

It is another object of the present invention to provide such a method wherein the portion of the actual profile curve is established by taking at least a pair of pressure sensings in the mold cavity of the molding machine while simultaneously making corresponding time measurements.

A further object of the present invention is to provide such a method wherein the portion of the actual profile curve whose slope is employed for purposes of effecting a comparison therewith of the slope of a corresponding portion of the theoretical profile curve may be selected so as to lie either along the rising portion of the profile curve or along the falling portion thereof.

A still further object of the present invention is to provide such a method wherein based on the comparison of the slope of the actual profile curve with that of the corresponding portion of the theoretical profile curve, the need for effecting corrective adjustments in the molding machine controls can be established.

Yet another object of the present invention is to provide such a method which is operative such that if corrective adjustments to the molding machine controls are deemed to be required through the use of the subject method, then such adjustments can be made so as to be effective either during the same cycle of operation of the molding machine for which the portion of the actual profile curve is established, or during a succeeding cycle of operation of the molding machine.

SUMMARY OF THE INVENTION

It has now been found that the foregoing and related objects can be readily attained in a method which is particularly suited for employment in conjunction with the operation of an injection molding machine for purposes of determining during the cycle of operation of the machine whether the material flow conditions to the mold cavity of the molding machine which are required for the production of parts having the desired characteristics are present. More specifically, a method is provided wherein a comparison is made between the slope of a portion of the actual pressure profile curve being generated during the flow of the material to the mold cavity of the machine and the slope of a corresponding portion of the theoretical pressure profile curve which should be generated by the material flowing to the mold cavity if parts having the desired characteristics are to be produced. For purposes of determining the slope of a portion of the actual profile curve, a plurality of pressure sensings are taken and time measurements corresponding thereto are made. The values for pressure and time obtained therefrom are then plotted on a graph having cavity pressure as the ordinate and time as the abscissa so as to produce a portion of an actual pressure profile curve. The slope of the latter referenced plotted portion of the actual pressure profile is determined and then compared to the slope of the corresponding portion of the theoretical pressure profile curve. Based on the latter comparison, any corrective adjustments, if found to be required, can then be made in the molding machine controls. Moreover, such adjustments can be made so as to take effect either during the same cycle of machine operation or during a succeeding cycle of operation thereof.

In accord with the preferred embodiment of the invention, a method is provided which utilizes the slope of at least a portion of a pressure profile curve for purposes of determining whether proper material flow conditions are being maintained for the material being fed to the mold cavity. For purposes of plotting the portion of the pressure profile curve whose slope is to be utilized, pressure sensing means are employed within the mold cavity. In addition, suitable timer means are also provided cooperatively associated with the molding machine so as to be operable in conjunction with the aforereferenced pressure sensing means. More specifically, the timer means can be suitably operatively connected with the controls of the molding machine whereby the actuation of a suitable Start switch to initiate a cycle of operation of the molding machine will also be effective to start the timer means running. Thereafter, with the timer means running, a sensing of pressure in the mold cavity is obtained through the use of the pressure sensing means provided for this purpose. Moreover, at the time when the pressure sensing is made, a time measurement is simultaneously obtained from the timer means. The values for pressure and time obtained in the aforedescribed manner are then employed as the ordinate and abscissa, respectively, of a point establishing a first location along the length of the actual pressure profile curve. Subsequent thereto a second pressure sensing is taken of the pressure existing in the mold cavity of the molding machine and then again a measurement of time is also noted. These values for pressure and time constitute the ordinate and abscissa, respectively, of a second point located along the length of the actual pressure profile curve. By interconnecting the two points, a portion of the actual pressure profile curve is established and from which the slope thereof may be determined. A comparison is then made between the value for the slope determined in the aforedescribed manner and the slope for the corresponding portion of the theoretical pressure profile curve. In the event that it is found that the slope of the portion of the actual pressure profile curve differs from that of the corresponding portion of the theoretical pressure profile curve, then there is evidenced from this fact a need to effect an adjustment in the controls of the molding machine. Such correctional adjustments in the molding machine controls can be made so as to take effect in the same cycle of operation of the molding machine as that during which the need therefor has been determined, or in a succeeding cycle of operation of the molding machine. For purposes of obtaining a greater representation of a portion of the actual pressure profile curve, a third point on the curve may be established by taking a further pressure sensing and noting the time at which the sensing was obtained. Thereafter, utilizing the values obtained therefrom as the ordinate and abscissa, respectively, the third point can be plotted. It is also possible rather than starting the timer means running simultaneously with the start of the machine's cycle of operation, to initiate the running of the timer means only when the first pressure snesing is taken. Finally, the method of the present invention is operable when the determination of the slope is made by establishing a portion of the actual pressure profile curve selected so as to lie either along the rising portion of the pressure profile curve or the falling portion thereof.

DETAILED DESCRIPTION OF THE ILLUSTRATED EMBODIMENT

Figure 1:
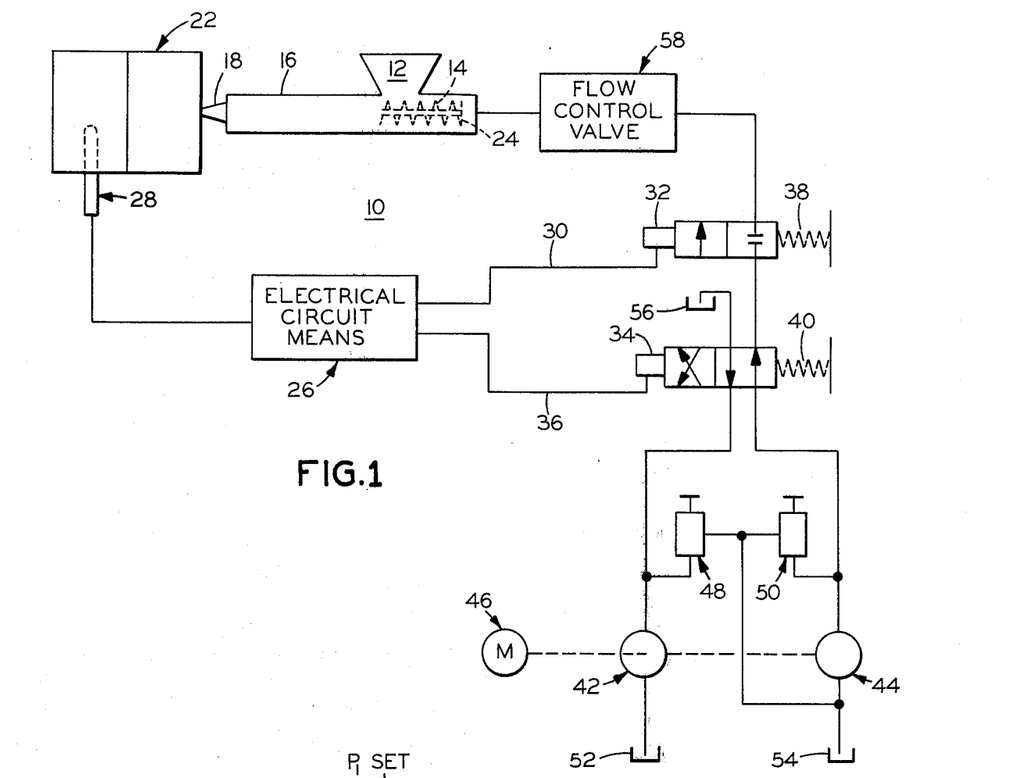
FIG. 1 is a block diagram of the major components of an injection molding machine with which the method in accord with the present invention can be practiced.

Referring now to the drawings, and more particularly FIG. 1 thereof, there is illustrated therein the major components of an injection molding machine, generally designated by reference numeral 10, with which the method of the present invention can be practiced. As understood with reference thereto, material of the type suitably adapted for molding purposes is supplied from a suitable source (not shown) to the feed hopper 12. In accord with conventional practice, the molding material supplied to the hopper 12 is fed therefrom into the space which exists between the screw 14 and the inner wall of the cylindrical housing 16 in which the screw 14 is suitably mounted for rotational movement. As the screw 14 rotates, the material which has been fed into the interior of the housing 16 is kneaded and plasticized by the action of the screw 14. Moreover, the rotational movement of the screw 14 causes the material to flow therefrom and into the nozzle 18. The material is injected from the nozzle 18 into the cavity of the mold 22. More specifically, the path of flow of the material is from the nozzle 18 through the sprue (not shown) and gate (not shown) to the cavity.

The screw 14 is connected at its right hand end as viewed with reference to FIG. 1 of the drawings, to a hydraulically operated injection cylinder 24. In a manner yet to be described, fluid such as hydraulic oil is pumped to the right hand end portion of the housing 16 as viewed with reference to FIG. 1 wherein the hydraulic oil functions to cause the movement of the cylinder 24 and thereby the screw 14. Moreover, as should be readily apparent, the extent of displacement of the screw 14 is one of the variables which determines the shot size, i.e., the amount of material which is injected into the mold 22 from the nozzle 18 and thus ultimately the amount of material which reaches the cavity.

Figure 2:
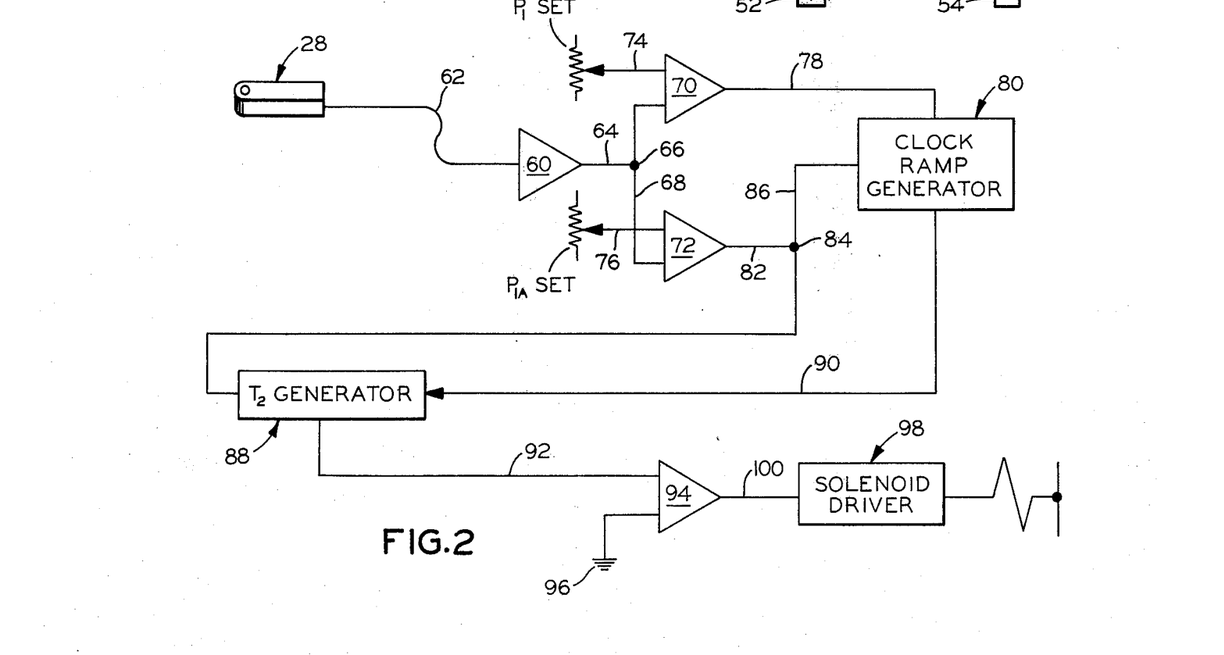
FIG. 2 is a schematic electrical diagram of the circuitry with which the injection molding machine of FIG. 1 may be provided in accord with the present invention for purposes of practicing the method of the present invention.

In order to eliminate variations in mold cavity pressure that cause flash, short shots and part inconsistencies to occur which necessitate the rejection of parts, the injection molding machine 10 as shown in FIG. 1 of the drawings is provided in accordance with the present invention with electrical circuit means operable to enable the method for utilizing a comparison of the slopes of corresponding portions of the actual pressure profile curve and the theoretical pressure profile curve as a basis for checking the quality of a given molded part, i.e., to determine whether the part needs to be rejected, and/or as a basis for effecting adjustments in the molding machine controls. The aforesaid electrical circuit means capable of accomplishing the latter function is depicted in FIG. 2 of the drawings and will be described hereinafter. Moreover, a schematic representation of the electrical circuit means depicted in FIG. 2 is provided in block diagram form in FIG. 1 of the drawings in the block bearing the legend "ELECTRICAL CIRCUIT MEANS" and which has the reference numeral 26 applied thereto. The aforereferenced electrical circuit means 26 is capable of being employed for purposes of effecting control over the operation of the molding machine 10. Accordingly, as shown in FIG. 1 of the drawings, the electrical circuit means 26 is connected in electrical circuit relation with a pressure sensing means 28. In a manner yet to be described, the pressure sensing means 28 is located in the molding machine 10 so as to be operable for purposes of sensing the pressure of the material being supplied to the mold 22. The latter pressure sensing means 28 may embody either a pressure transducer operable for purposes of producing an analog output on a pressure switch which produces a digital output.

Continuing with a description of the other major components which are depicted in FIG. 1 of the drawings as being operatively associated with the molding machine 10 and the electrical circuit means 26, there will now be set forth a description of the pump means which is operable to provide the hydraulic oil to the injection cylinder 24 where the oil is utilized for purposes of causing the movement of the cylinder 24. As shown in FIG. 1, the electrical circuit means 26 is connected in electrical circuit relation by means of conductor 30 to the solenoid 32. Moreover, the electrical circuit means 26 is similarly connected in electrical circuit relation to the solenoid 34 by means of conductor 36. The manner in which control is effected over the solenoids 32 and 34 through the electrical circuit means 26 will be described more fully hereinafter. At this point, it is merely sufficient to note that the operation of the solenoids 32 and 34 is controlled through the electrical circuit means 26.

As shown in FIG. 1 of the drawings, the solenoid 32 which comprises a part of the solenoid operated valve 38 is the injection forward solenoid which allows hydraulic oil to flow to the injection cylinder 24. The solenoid 34 which comprises a part of the solenoid operated valve 40 is the booster solenoid which allows the high pressure or high volume pump 42 to supply hydraulic oil to the injection cylinder 24. As will be described more fully hereinafter, when a predetermined condition is sensed to exist in the molding machine 10, the electrical circuit to the booster solenoid 34 is open. This in turn is effective to deenergize the booster solenoid 34 and switch the booster pump 42 out of the hydraulic circuit thereby allowing the holding pump 44 to supply hydraulic oil to the injection cylinder 24. In addition, when a second predetermined condition is sensed to occur in the molding machine 10, the injection forward solenoid 32 becomes energized which stops the flow of all hydraulic oil to the injection cylinder 24.

Referring further to FIG. 1 of the drawings, the pumps 42 and 44 are operatively connected to the motor 46 in conventional fashion so as to be capable of being driven thereby. Furthermore, preferably regulating valves 48 and 50 are provided in the fluid circuit between the pumps 42 and 44. respectively, and the injection cylinder 24. The regulating valve 48 is employed as a means of providing a control setting for the booster pressure while the regulating valve 50 is employed as a means of providing a control setting for the holding pressure. Finally, suitable drain tanks 52, 54, and 56 are preferably associated with the pump 42, pump 44, and the solenoid operated valve 48, respectively.

Completing the description of the manner in which hydraulic oil is fed to the injection cylinder 24, in accord with the illustrated embodiment of the molding machine 10 a flow control valve 58 is preferably interposed between the solenoid operated valve 38 and the injection cylinder 24. Through the operation of the flow control valve 58, the flow rate for the hydraulic oil being fed to the injection cylinder 24 is set prior to the commencement of a cycle of operation of the molding machine 10. In accord with the illustrated embodiment of the molding machine 10, the flow control valve 58 comprises an electrohydraulic valve of the type commonly used on molding machines. Although adjustment of the flow control valve 58 can be effected in many different ways, preferably this is done automatically through suitable means (not shown) which are connected in electrical circuit relation therewith. Moreover, although the flow control valve 58 has been depicted as comprising the means through which the flow rate of hydraulic oil to the injection cylinder 24 is established, it is to be understood that this function could also be accomplished through the use of other means without departing from the essence of the invention such as for instance through the use of a servomotor, adjusting the hydraulic mechanical valves 48 and 50, or if desired by hand.

Turning now to a description of the electrical circuitry depicted in FIG. 2 of the drawings, the pressure sensing means 28 is connected in electrical circuit relation with the amplifier 60 by means of electrical conductor 62. The function of the amplifier 60 is to amplify the electrical signal received thereby from the pressure sensing means 28. The output from the amplifier 60 is fed by means of electrical conductor 64, junction 66 and electrical conductor 68 as an input to each of a pair of comparators 70 and 72. A second input is provided to the comparator 70 by means of electrical conductor 74. More specifically, the second input which is received by the comparator 70 is preestablished and corresponds in value to a predetermined pressure setting of $P_1$. Similarly, the comparator 72 receives a second input by means of the electrical conductor 76. Moreover, the second input which is received by the comparator 72 is preestablished and corresponds in value to a predetermined pressure setting of $P_{1a}$. In a manner well-known to those skilled in the art, when the output from the amplifier 60 which is provided as an input to the comparator 70 equals the value of the other input being provided to the latter, an output is produced from the comparator 70 which is supplied by electrical conductor 78 to the clock and ramp generator 80 which is operative to initiate the start of a timing cycle by the latter. Namely, when the pressure sensed by the pressure sensing means 28 equals the $P_1$ pressure setting with which the comparator 70 is being provided, the aforedescribed output is provided from the comparator 70. In a similar manner, when the output from the amplifier 60 which is provided as an input to the comparator 72 equals the value of the other input being provided to the latter, an output is produced from the comparator 72 which is supplied by electrical conductor 82, through junction 84 and electrical conductor 86 to the aforedescribed clock and ramp generator 80 whereupon the latter referenced output is operative as a stop signal to effect a termination of the running of the timing cycle which had been initiated by the receipt by the clock and ramp generator of an output signal from the comparator 70. Namely, when the pressure sensed by the pressure sensing means 28 equals the $P_{1a}$ pressure setting with which the comparator 72 is being provided, the aforedescribed output is provided from the comparator 72. It will also be noted with reference to FIG. 2 of the drawings that in a manner to which further reference will be had subsequently the output from the comparator 72 is also supplied by means of electrical conductor 82, junction 84 and electrical conductor 86 as an input to a second generator 88.

Continuing with the description of the electrical circuitry shown in FIG. 2 of the drawings, there is provided an output which is fed from the clock and ramp generator 80 as an input to the second generator 88 by means of the electrical conductor 90. The function of the generator 88 is to provide a second time function, i.e., timing cycle. This second timing cycle commences when the timing cycle provided by the clock and ramp generator 80 terminates. More specifically, the output from the clock and ramp generator 80 operates to initiate the start of the timing cycle by the second generator 88. The termination of the timing cycle being generated by the generator 88 occurs upon the receipt by the latter of a Stop signal. The latter Stop signal is provided as an input to the second generator 88. More specifically, the input provided by the electrical conductor 86 to the second generator 88 constitutes an output derived from the comparator 72.

With further regard to the nature of the electrical circuitry which is depicted in FIG. 2 of the drawings, the output from the second generator 88 is supplied by means of electrical conductor 92 to the detector 94 as one input thereto. The other input to the detector 94 is connected to ground 96. FInally, the output from the detector 94 is transmitted by means of electrical conductor 100 to a solenoid driver circuit, schematically depicted in FIG. 2 by the block designated therein by reference numeral 98. The solenoid driver circuit 98 in turn is operatively connected to the solenoid 34 whereby the former effects control over the latter. As has been described previously hereinabove in connection with the description of the molding machine 10 illustrated in FIG. 1 of the drawings, the solenoid 34 which comprises a part of the solenoid operated valve 40 is the booster solenoid which allows the high pressure or high volume pump 42 to supply hydraulic oil to the injection cylinder 24. Regarding the solenoid driver circuit 98, inasmuch as the nature of such circuits are well known to those skilled in the art, it has not been deemed necessary for one to obtain an understanding of the present invention to describe more fully herein and/or illustrate more fully in the drawings the aforesaid solenoid driver circuit 98. Rather, it is deemed sufficient to note that in response to a predetermined output being provided from the detector 94 by means of electrical conductor 100 to the solenoid driver circuit 98, the latter operates to effect an opening of the electrical circuit to the booster solenoid 34. When this occurs, the booster solenoid 34 becomes deenergized and the booster pump 42 is switched out of the hydraulic circuit thereby allowing the holding pump 44 to supply hydraulic oil to the injection cylinder 24.

Figure 3:
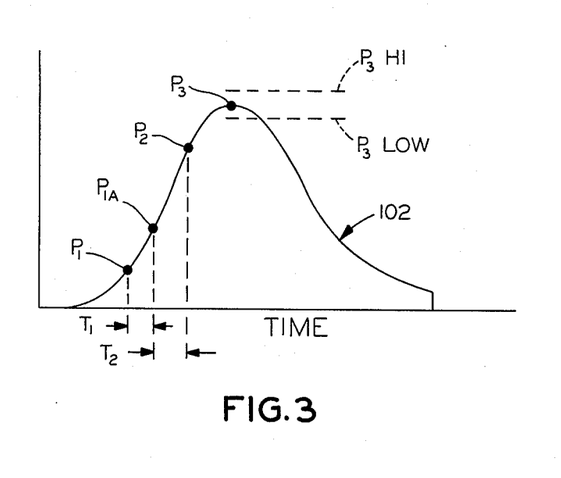
FIG. 3 is a graph of a typical profile curve depicting the portion thereof whose slope is utilized in practicing the method in accord with the present invention as being located along the rising portion of the pressure profile curve.

Turning now to a consideration of FIG. 3 of the drawings, there is illustrated therein a graph which has plotted thereon a typical pressure profile curve 102. More specifically, in FIG. 3 of the drawings there is shown a plot of cavity pressure versus time for a conventional molding machine 10. In this connection, in the graph the cavity pressure, i.e., the pressure being exerted in the mold cavity by the material being provided thereto in pounds per square inch is employed as the ordinate and time, i.e., the time period over which the aforedescribed cavity pressure rises, in any suitable units thereof comprises the abscissa of the graph. The shape of the pressure profile curve 102 is well known to those skilled in the molding art. Moreover, it is also well known that the pressure profile curve 102 must have a particular shape, i.e., the pressure must follow a specific path, if parts being produced in the mold cavity of the molding machine 10 are to embody the desired characteristics. Namely, it is necessary that the peak pressure, identified in FIG. 3 by the point which bears the legend $P_3$ must fall within a pre-established range, the latter being defined by the pair of spaced, horizontally extending lines labelled in FIG. 3 of the drawings, $P_3HI$ and $P_3Low$.

In addition, it is necessary that the peak pressure $P_3$ be reached at the end of a predetermined time interval after the initiation of the start of the cycle of operation of the molding machine 10. As noted above, the shape of the pressure profile curve 102, i.e., the path followed by the cavity pressure in the mold cavity of the molding machine 10 over the length of one cycle of operation of the molding machine 10 can be predetermined so as to ensure if the subject shape of the pressure profile curve generated during an actual cycle of operation of the molding machine 10 conforms to that depicted in FIG. 3 of the drawings the part molded during that particular cycle of operation of the molding machine 10 will possess the characteristics desired therefor.

In this connection, it should be noted for instance with reference to the pressure profile curve 102 that as cavity pressure rises toward the peak pressure $P_3$ that this rise be gradual, i.e., take place over several units of time. Namely, it is important that the path which the cavity pressure follows not be one in which the cavity pressure holds at a certain level and then rises sharply substantially instantaneously to the peak pressure $P_3$. The latter course of movement of the cavity pressure if plotted would appear on a graph as a relatively horizontal line, the latter denoting a relatively constant pressure over a period of time, followed by a relatively vertical line, the latter denoting a relatively rapid rise in cavity pressure over a relatively short time period. In summary, it is to be understood that for a given plastic and mold there is generated a particular curve which is due to the specific energy inputs to the plastic and energy outputs from the plastic. Technically, referring to FIG. 3 the area under the pressure profile curve 102 is a measure of impulse, namely force times time. The pressure profile curve 102 can be thought of as embodying three principal areas. The first of these represents the area under the first portion of the pressure profile curve and may be thought of as being that area defined by the start of the rise in cavity pressure until the cavity is full. This first area is generated by the material flowing through the mold during fill and is primarily a measure of kinetic energy. The second of the three areas comprises that portion of the total area under the curve which occurs after the mold is full until peak pressure $P_3$ occurs. This rise in cavity pressure which establishes the size of the second area occurs during the packing phase of the cycle of operation of the molding machine 10. Moreover, this pressure rise is due to static pressure transfer from the injection cylinder 24. The peak pressure $P_3$ is a measure of a number of plastic molecules in the mold cavity of the molding machine 10. The third of the three areas which together equal the total area under the pressure profile curve begins at peak pressure $P_3$ and continues until the mold opens. This third area is generated during the cooling phase of the cycle, and the drop in plastic pressure therein results from the loss of thermal energy. An additional cause of pressure loss can be due to discharge, i.e., the plastic in the gate not sealing before the hydraulic pressure being applied by the injection cylinder 24 is released.

With further reference to FIG. 3 of the drawings, by determining the slope of at least a portion of the pressure profile curve 102, i.e., the rate of rise of cavity pressure over time, assuming for the moment that the pressure profile curve 102 represents the actual pressure profile curve that is being generated as the material is fed to the mold cavity of the molding machine 10, it is possible by comparing the aforereferenced slope to the slope of the corresponding portion of the theoretical pressure profile curve which should exist if a part having the desired characteristics is to be produced, to determine whether the part which is being molded during the present cycle of operation of the molding machine 10 will be acceptable. To this end, it will be assumed that the shape of the pressure profile curve which is required to be followed by the cavity pressure in order to produce acceptable molded parts has been preestablished for the particular material and mold which are being employed to mold the parts. With this information being available, the next step is to establish a portion of the actual pressure profile curve which is being generated by the cavity pressure during the course of one cycle of operation of the molding machine. Referring to FIG. 3 of the drawings, the manner in which a portion of the actual pressure profile curve is established will now be described. For purposes of the following, it will be assumed that the shape of the pressure profile curve 102 appearing in FIG. 3 of the drawings remains yet unknown. Moreover, it will be assumed for purposes of the following that it is desired to determine the slope of a portion of the actual pressure profile curve which lies along the rising portion thereof, i.e., the portion of the actual pressure profile curve before peak pressure is reached. The desired portion of the actual pressure profile curve may be produced in the following manner. Namely, by utilizing information derived from the electrical circuitry depicted in FIG. 2 of the drawings, it is possible to establish a pair of points which lie along the actual pressure profile curve. More specifically, it is possible therefrom to locate a first point along the actual pressure profile curve corresponding to a cavity pressure level of $P_1$ and a second point along the actual pressure profile curve corresponding to a cavity pressure level of $P_{1a}$. For purposes of this discussion, the aforereferenced points $P_1$ and $P_{1a}$ have both been indicated on the pressure profile curve 102 appearing in FIG. 3 of the drawings. To this end, it is possible to utilize the output produced by the comparator 70 when the cavity pressure as sensed by the pressure sensing means 28 equals the $P_1$ setting which is provided as the other input to the comparator 70. Namely, the latter output can be fed to a suitable timer means whereat this output is effective to terminate the running of the latter time means. It is assumed in this connection that the running of the latter referenced timer means has been initiated simultaneously with the start of the cycle of operation of the molding machine. Consequently, it is a very simple matter to obtain from the timer means an indication of the length of the time period which it took for the cavity pressure from the start of the cycle of operation of the molding machine to reach a level equivalent to a value of $P_1$. The latter indication of the time period measured by the timer means may take the form of an electrical signal generated thereby, or a visual indicator such as for instance a counter which is operative to provide a numerical indication of the number of units of time that have elapsed during the time period, etc. The coordinates for the second point, i.e., for the point $P_{1a}$ are established in a similar manner. Namely, the output produced by the comparator 72 when the cavity pressure as sensed by the pressure sensing means 28 equals the $P_{1a}$ setting which is provided as the other input to the comparator 72 may be employed in this connection. Since the length of the time period which has elapsed from the time when the cavity pressure reaches a level of $P_1$ to that when the cavity pressure reaches a level of $P_{1a}$ corresponds to the length of the running of the clock and ramp generator 80 which is shown embodied in the electrical circuitry of FIG. 2, the latter means, i.e., the generator 80 may be employed for purposes of providing an indication of how long it took the cavity pressure to reach a level of $P_{1a}$, i.e., locate the point $P_{1a}$ relative to the previously established point $P_1$ on the actual pressure profile curve. In this connection, it will be remembered as has been described previously hereinabove that the timing cycle provided by the clock and ramp generator 80 is initiated upon the latter being provided with a predetermined output from the comparator 70 when the cavity pressure sensed by the pressure sensing means 28 equals the pressure setting of $P_1$, and is terminated when the clock and ramp generator 80 is provided with a predetermined output from the comparator 72 when the cavity pressure sensed by the pressure sensing means 28 equals the pressure setting of $P_{1a}$. As in the case of the other timer means, the indication provided by the clock and ramp generator 80 of the elapsed time between the time when the cavity pressure reaches a level of $P_1$ and the time the cavity pressure reaches a level of $P_{1a}$ may take the form of an electrical output from the generator 80, a visual indicator such as that provided by a counter, etc. With the coordinates for both points, namely that of $P_1$ and $P_{1a}$ now being known, the latter can be manually plotted on a graph and thereafter interconnected whereby to produce a portion of the actual pressure profile curve. Moreover, by employing well known mathematical techniques, it is a relatively simple matter to determine the slope thereof, i.e., the rate of rise of the cavity pressure in going from a pressure level of $P_1$ to a pressure level of $P_{1a}$ over the time it took for the cavity pressure to rise from $P_1$ to $P_{1a}$. Having the value for slope in hand, the next step is to compare it to the slope of the corresponding portion of the theoretical pressure profile curve. In this case, since the theoretical pressure profile curve is preestablished for the particular material and mold that are being employed, and since points having a pressure value of $P_1$ and $P_{1a}$ have been preselected for purposes of creating a portion of the actual pressure profile curve, it is possible before the cycle of operation of the molding machine is initiated to determine what the value is of the slope of the aforereferenced corresponding portion of the theoretical pressure profile curve. Based upon the comparison of the two slopes, if it is found that they differ, suitable correctional adjustments can be made in the molding machine controls. In this regard, once a difference has been noted between the two slopes, the nature of the adjustment which must be made in order to have the slope of the actual pressure profile curve conform to that of the theoretical pressure profile curve can be readily determined by one skilled in the operation of molding machines.

In order to provide more of a representation of the actual pressure profile curve, i.e., a longer segment thereof from which to calculate the slope, as depicted in FIG. 3 of the drawings, a third point corresponding to a pressure level of $P_2$ may be established along the actual pressure profile curve. If it is desired to utilize such a third point, the electrical circuitry of FIG. 2 may be easily modified by adding thereto a third comparator connected in electrical circuit relation with the pressure sensing means 28 so as to receive sensings therefrom and also in series circuit relation with the amplifier 60 whereby the output from the pressure sensing means 28 before reaching the third comparator (not shown) passes through the amplifier 60 whereat the signal is amplified and then is sent to the third comparator. As in the case of the comparators 70 and 72 of the electrical circuitry of FIG. 2, the output provided from the pressure sensing means 28 comprises one input to the third comparator. The other input to the third comparator corresponds to a preset pressure setting of $P_2$. Consequently, when the pressure sensed in the cavity by the pressure sensing means 28 equals the $P_2$ pressure setting, a predetermined output is produced from the third comparator. The other input to the third comparator corresponds to a preestablished setting of $P_2$. The latter output may be employed for purposes of providing an electrical signal to a suitable timer means cooperatively associated with the third comparator and the comparator 72 so as to be operable in the following manner. Namely, the latter referenced timer means is suitably connected in electrical circuit relation with the comparator 72 so as to receive the output therefrom produced when the pressure sensing received thereby from the pressure sensing means 28 equals a pressure of $P_{1a}$. The aforereferenced output from the comparator 72 is utilized to initiate the running of a timing cycle by the timer means. The latter timing cycle is terminated upon an output signal being provided thereto from the third comparator when the pressure sensing means 28 senses a pressure level of $P_2$ in the mold cavity. Thus, by knowing the length of the time period it took for the cavity pressure to rise from a level of $P_{1a}$ to a level of $P_2$, which information pertaining to time is obtained from the timer means, and the value for $P_2$, it is a relatively simple matter to plot the third point, i.e., locate the point $P_2$ on the actual pressure profile curve. Thereafter, by utilizing the portion of the actual pressure profile curve defined by the points $P_1$ and $P_2$, it is possible to determine the slope therefor and to compare this slope to that of the corresponding portion of the theoretical pressure profile curve for purposes of determining whether the desired material flow conditions to the mold cavity are being maintained so that the resulting molded part will have the proper characteristics.

Although the discussion found set forth hereinabove relating to the procedure to be followed in establishing a portion of the actual pressure profile curve by plotting the location of at least a pair of points therealong, followed by the determination of the slope of the aforesaid portion of the actual pressure profile curve and the subsequent comparison of this slope to that of the corresponding portion of the theoretical pressure profile curve has impliedly indicated that the aforesaid steps are carried out manually, it is to be understood that these steps can also be performed in other ways. Namely, it is possible to perform the aforementioned steps automatically through the utilization of commercially available electrical equipment which is well-known to those in the processing art. Moreover, in addition it is also possible to operatively connect the aforereferenced electrical circuitry in electrical circuit relation with control means whereby the output from such electrical circuitry is effective to cause the control means to produce the proper correctional adjustments, when required, i.e., when the slope of the established portion of the actual pressure profile curve is found to differ from that of the corresponding portion of the theoretical pressure profile curve, in the molding machine controls. The latter mode of operation is particularly useful when it is desired to effect the correctional adjustment during the same cycle of operation of the molding machine in which the need therefor is determined as opposed to effecting such a correctional adjustment during a succeeding cycle of machine operation.

Figure 4:
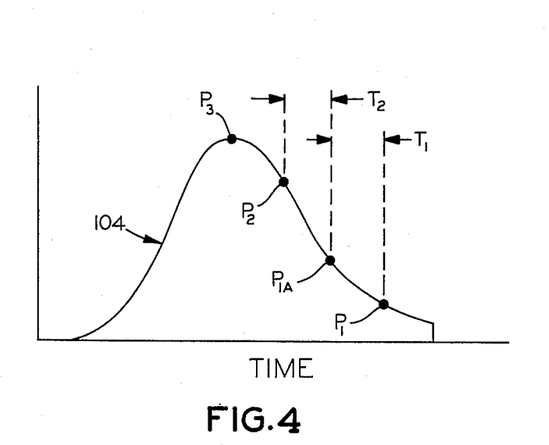
FIG. 4 is a graph of a typical profile curve depicting the portion thereof whose slope is utilized in practicing the method in accord with the present invention as being located along the falling portion of the pressure profile curve.

Turning now to a consideration of FIG. 4 of the drawings, there is found depicted therein a plot of an actual pressure profile curve 104 which is identical to that found illustrated in FIG. 3 of the drawings except that the points $P_1$, $P_{1a}$ and $P_2$ which are shown in FIG. 3 as lying along the rising portion of the pressure profile curve, in FIG. 4 of the drawings are found located along the falling portion of the pressure profile curve. The purpose of including both the illustration of FIG. 3 and that of FIG. 4 in the application is to clearly indicate that the method of the present invention is capable of being utilized when the slope of the actual pressure profile curve to be compared to that of the theoretical pressure profile curve is for a segment of the actual pressure profile curve which is located along the rising portion of the latter as well as where the slope is for a segment of the actual pressure profile curve which is located along the falling portion of the latter. Insofar as concerns the actual establishment of the points $P_1$, $P_{1a}$ and $P_2$ along the pressure profile curve 104 appearing in FIG. 4 of the drawings, the same general steps are followed as those which have been described previously hereinabove in connection with the discussion of the pressure profile curve 102 in FIG. 3. Namely, with slight modification the electrical circuitry appearing in FIG. 2 of the drawings may be employed in this connection. More specifically, recognition is given to the fact that the cavity pressure passes through a pressure level of $P_1$, $P_{1a}$ and $P_2$ both when the pressure in the mold cavity is rising towards peak pressure as well as thereafter when the pressure in the mold cavity is falling, i.e., both the rising portion and the falling portion of the actual pressure profile curve have located therealong points corresponding to a pressure level of $P_1$, $P_{1a}$ and $P_2$. Consequently, since the pressure sensing means 28 remains operative to provide sensings of cavity pressure after peak pressure has been reached, i.e., is operative to sense pressures in the mold cavity during the falling portion of the actual pressure profile curve, the outputs generated by the pressure sensing means 28 as the cavity pressure is falling from peak pressure when the pressure falls through the levels equivalent to $P_1$, $P_{1a}$ and $P_2$, are employed for purposes of determining the ordinate therefor. Moreover, by cooperatively associating suitable timer means with the pressure sensing means 28, the amplifier 60 and the comparators 70 and 72, it is possible to determine therefrom a value for the abscissa of each of the points $P_1$, $P_{1a}$ and $P_2$, i.e., to measure the interval of time between when the cavity pressure decreases from a pressure level of $P_2$ to $P_{1a}$ and from $P_{1a}$ to a level of $P_1$. The values corresponding to the level of pressure denoted in the drawings as $P_2$, are provided by adding a third comparator and suitable additional timer means in electrical circuit relation with the pressure sensing means 28 and the amplifier 60. One difference which must be taken into consideration insofar as concerns the mode of operation of the electrical circuitry utilized for purposes of determining the coordinates of the points $P_1$, $P_{1a}$ and $P_2$ on the pressure profile curve 102 shown in FIG. 3 of the drawings, and that utilized for purposes of determining the coordinates of the points $P_1$, $P_{1a}$ and $P_2$ on the pressure profile curve 104 shown in FIG. 4 of the drawings involves the sequence in which the mold cavity pressure arrives at the various pressure levels of $P_1$, $P_{1a}$ and $P_2$. Namely, in the case of the pressure profile curve 102 of FIG. 3, since the points $P_1$, $P_{1a}$ and $P_2$ all lie along the rising portion of the curve, the pressure sensing means 28 will first sense a pressure level equivalent to the pressure $P_1$ in the mold cavity. This will then be followed by an output produced by the pressure sensing means 28 indicating that a pressure level of $P_{1a}$ has been reached in the mold cavity, and finally an output will be provided therefrom indicating that the pressure in the mold cavity has reached a level of $P_2$. On the other hand, in the case of the pressure profile curve 104 of FIG. 4, since the points $P_1$, $P_{1a}$ and $P_2$ all lie along the falling portion of the curve, the pressure sensing means 28 after peak pressure has been reached and the cavity pressure begins to decline, will first provide an output indicating that the mold cavity pressure has reached the pressure level of $P_2$. This will then be followed by an output indicating that a pressure level of $P_{1a}$ has been reached, and finally an output will be provided indicating that the pressure in the mold cavity has reached the level of $P_1$. The significance with regard to the order in which the mold cavity pressure passes through the pressure levels of $P_1$, $P_{1a}$ and $P_2$ is that if the outputs from the comparators 70 and 72 and the third comparator are employed for purposes of initating and terminating the running of the various timing cycles by the timer means, then in the case of the pressure profile curve 102, the output from the comparator 70 will be employed to initiate the running of a timing cycle and the output from the comparator 72 will be employed to terminate the running of the latter described timing cycle. On the other hand, the reverse procedure will be followed in the case of the pressure profile curve 104 of FIG. 4. Namely, the output from the comparator 72 will function to initiate the running of a timing cycle while the output from the comparator 70 will serve to terminate the running of the latter referenced timing cycle.

From the above, it can be seen that in accordance with the present invention a method has been provided which utilizes the slope of at least a segment of either the rising portion or the falling portion of a pressure profile curve for purposes of determining whether proper material flow conditions are being maintained for the material being fed to the mold cavity. For purposes of plotting the segment of the pressure profile curve whose slope is to be utilized, pressure sensing means are employed within the mold cavity. In addition, suitable timer means are also provided cooperatively associated with the aforereferenced pressure sensing means. More specifically, the timer means can be suitably operatively connected with the controls of the molding machine whereby the actuation of a suitable Start switch to initiate a cycle of operation of the molding machine will also be effective to start the timer means running. Thereafter, with the timer means running, a sensing of pressure in the mold cavity is obtained through the use of the pressure sensing means provided for this purpose. Moreover, at this time when the pressure sensing is made, a time measurement is simultaneously obtained from the timer means. The values for pressure and time obtained in the aforedescribed manner as then employed as the ordinate and abscissa, respectively, of a point establishing a first location along the length of the actual pressure profile curve. Subsequent thereto a second pressure sensing is taken of the pressure existing in the mold cavity of the molding machine and then again a measurement of time is also noted. These values for pressure and time constitute the ordinate and abscissa, respectively of a second point located along the length of the actual pressure profile curve. By interconnecting the two points, a segment of the actual pressure profile curve is established and from which the slope thereof may be determined. A comparison is then made between the value for the slope determined in the aforedescribed manner and the slope for the corresponding segment of the theoretical pressure profile curve. In the event that it is found that the slope of the segment of the actual pressure profile curve differs from that of the corresponding segment of the theoretical pressure profile curve, then there is evidenced from this fact a need to effect an adjustment in the controls of the molding machine. Such correctional adjustments in the molding machine controls can be made so as to take effect in the same cycle of operation of the molding machine as that during which the need therefor has been determined, or in a succeeding cycle of operation of the molding machine. For purposes of obtaining a greater representation of a segment of the actual pressure profile curve, a third point on the curve may be established by taking a further pressure sensing and noting the time at which the sensing was obtained. Thereafter, utilizing the values obtained therefrom as the ordinate and abscissa, respectively, the third point can be plotted. It is also possible rather than starting the timer means running simultaneously with the start of the machine's cycle of operation, to initiate the running of the timer means only when the first pressure sensing is taken. Additionally, it is to be understood that the method of the present invention is operable for determining the slope of a segment of an actual pressure profile curve either when the segment selected for this purpose lies along the rising portion of the actual pressure profile curve or along the falling portion thereof. Finally, it is to be further understood that the steps of locating the various points which in turn define a segment of the actual pressure profile curve which is chosen for comparison to a corresponding segment of the theoretical pressure profile curve, as well as that of determining the slope of the aforesaid segment and then comparing this slope to the slope of the corresponding segment of the theoretical pressure profile curve can all be performed electrically through the use of well-known electrical components rather than manually. Electrical processing of the aforereferenced information obviously is preferable when same cycle corrections are desired to be made when the need therefor is found to exist based on a comparison of the slopes of corresponding segments of the actual and theoretical pressure profile curves.

Although several embodiments of systems which may be utilized for purposes of practicing the method of the present invention have been shown in the drawings and described hereinabove, it is to be understood that modifications may be made therein by those skilled in the art without departing from the essence of the present invention. In this connection, some of the modifications which can be made therein have been alluded to hereinabove while others will become readily apparent to those skilled in the art when exposed to the preceding description and the illustrations contained in the drawings. For instance, in practicing the method of the present invention, the slope of a segment of the actual pressure profile curve lying along either the rising portion of the curve or the falling portion of the curve may be utilized. Also, the information required for purposes of establishing the aforesaid segment of the actual pressure profile curve can be obtained from the electrical circuitry, with minor modifications being required thereto, which effect the performance of a cycle of operation of the molding machine. In addition, the aforereferenced information may be processed either manually or electrically. Moreover, if correctional adjustments are found to be necessitated based on the results obtained from practicing the method in accordance with the present invention, then such correctional adjustments can be effected in the molding machine controls so as to take effect either during the same cycle of machine operation as that in which the need therefor was determined, or in a succeeding cycle thereof.

Thus, it can be seen that the present invention provides a novel and improved method which is operable for purposes of determining whether the material flow conditions to the mold cavity of a molding machine which must be present in order to ensure the production of molded parts having the desired characteristics do in fact exist. Also, in accordance with the present invention a method is provided wherein there is established a segment of the actual profile curve of the pressure of the material present in a mold cavity during a cycle of operation of a molding machine from which the slope of the aforesaid segment of the actual pressure profile curve may be determined, and thereafter compared to the corresponding segment of the theoretical pressure profile curve which should exist in order to obtain the desired product results. In addition, a method has been provided wherein the segment of the actual pressure profile curve is established from information derived by taking at least a pair of pressure sensings in the mold cavity of the molding machine while simultaneously making corresponding time measurements. Moreover, the method of the present invention is operable such that the segment of the actual pressure profile curve whose slope is employed for purposes of effecting a comparison therewith to the slope of a corresponding segment of the theoretical pressure profile curve may be selected so as to lie along either the rising portion of the pressure profile curve or the falling portion thereof. Furthermore, in accord with the present invention a method has been provided wherein based on the comparison of the slope of a segment of the actual pressure profile curve with that of a corresponding segment of the theoretical pressure profile curve, the need for effecting correctional adjustments in the molding machine controls can be determined. Finally, the method of the present invention is operative such that if correctonal adjustments to the molding machine controls are determined to be required through the use thereof, then such adjustments can be made so as to be effective either during the same cycle of operation of the molding machine for which the segment of the actual pressure profile curve is established, or during a succeeding cycle of operation of the molding machine.

Having thus described the invention, we claim:

1. A method operable for evaluating pressure profile of material flowing to a mold cavity and thereby determining the quality of a part being molded during a given cycle of operation of a molding machine while the given cycle of operation is in process comprising the steps of:
   a. establishing the location of a first point comprising one end of a segment of the actual profile curve produced by the pressure of the material flowing to the mold cavity of the molding machine during the given cycle of operation thereof;
   b. establishing the location of a second point comprising the other end of the segment of the actual profile curve produced by the pressure of the material flowing to the mold cavity of the molding machine during the given cycle of operation thereof;
   c. determining the value of the slope of the segment of the actual profile curve defined by the location therealong of the first and second points;
   d. providing the value of the slope of the corresponding segment of the theoretical profile curve produced by the pressure of the material flowing to the mold cavity of the molding machine when a part of acceptable quality is molded during a cycle of operation thereof; and
   e. comparing the value of the slope of the segment of the actual profile curve to the value of the slope of the corresponding segment of the theoretical profile curve for purposes of detecting the existence of any significant difference therebetween indicative of the fact that the part being molded during the given cycle of operation of the molding machine is of unacceptable quality.

2. The method as set forth in claim 1 further comprising the step of effecting correctional adjustments in the controls of the molding machine when the value of the slope of the segment of the actual profile curve is found to be significantly different from the slope of the corresponding segment of the theoretical profile curve.

3. The method as set forth in claim 2 wherein the step of effecting correctional adjustments in the controls of the molding machine is performed during the given cycle of operation of the molding machine.

4. The method as set forth in claim 2 wherein the step of effecting correctional adjustments in the controls of the molding machine is performed during the cycle of operation of the molding machine succeeding the given cycle of operation thereof.

5. The method as set forth in claim 1 wherein the segment of the actual profile curve established by the location of the first and second points lies along the rising portion of the actual profile curve.

6. The method as set forth in claim 1 wherein the segment of the actual profile curve established by the location of the first and second points lies along the falling portion of the actual profile curve.

7. The method as set forth in claim 1 wherein the location of the first point is established by determining in a Cartesian coordinate system the value for the ordinate and the abscissa of the first point.

8. The method as set forth in claim 7 wherein the ordinate of the first point is a function of the pressure in the mold cavity and has a value equal to a predetermined first pressure level.

9. The method as set forth in claim 8 wherein the abscissa of the first point is a function of time and has a value equal to the elapsed time between when the start of the given cycle of operation of the molding machine is initiated and the point in time when the pressure in the mold cavity during the given cycle of operation of the molding machine reaches a level equivalent to the predetermined first pressure level.

10. The method as set forth in claim 9 wherein the location of the second point is established by determining in a Cartesian coordinate system the value for the ordinate and the abscissa of the second point.

11. The method as set forth in claim 10 wherein the ordinate of the second point is a function of the pressure in the mold cavity and has a value equal to a predetermined second pressure level.

12. The method as set forth in claim 11 wherein the abscissa of the second point is a function of time and has a value equal to the elapsed time between the point in time when the pressure in the mold cavity during the given cycle of operation of the molding machine reaches a level equal to the predetermined first pressure level and the point in time when the pressure in the mold cavity during the given cycle of operation of the molding machine reaches a level equal to the predetermined second pressure level.

* * * * *